United States Patent
Wu et al.

(10) Patent No.: US 9,897,861 B2
(45) Date of Patent: Feb. 20, 2018

(54) LIQUID CRYSTAL DISPLAY DEVICE AND LIQUID CRYSTAL DISPLAY PANEL THEREOF

(71) Applicant: Shenzhen China Star Optoelectronics Technology Co., Ltd., Shenzhen, Guangdong (CN)

(72) Inventors: Chuan Wu, Guangdong (CN); Shih-hsun Lo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 110 days.

(21) Appl. No.: 14/767,987

(22) PCT Filed: May 25, 2015

(86) PCT No.: PCT/CN2015/079683
§ 371 (c)(1),
(2) Date: Aug. 14, 2015

(87) PCT Pub. No.: WO2016/155100
PCT Pub. Date: Oct. 6, 2016

(65) Prior Publication Data
US 2017/0038618 A1  Feb. 9, 2017

(30) Foreign Application Priority Data
Mar. 30, 2015 (CN) .......................... 2015 1 0145960

(51) Int. Cl.
*G02F 1/1339* (2006.01)
*G02F 1/1333* (2006.01)
(Continued)

(52) U.S. Cl.
CPC ........ *G02F 1/1339* (2013.01); *G02F 1/13394* (2013.01); *G02F 1/133345* (2013.01);
(Continued)

(58) Field of Classification Search
CPC ............. G02F 1/133512; G02F 1/0107; G02F 1/1339; G02F 1/13394; G02F 1/13398;
(Continued)

(56) References Cited

U.S. PATENT DOCUMENTS 5,748,266 A * 5/1998 Kodate ............. G02F 1/136213
349/106
7,646,465 B2 * 1/2010 Son ........................ G02F 1/1339
349/106
(Continued)

FOREIGN PATENT DOCUMENTS

CN     101441349 A    11/2007
CN     103926759 Y    4/2014
(Continued)

*Primary Examiner* — Angela Davison
(74) *Attorney, Agent, or Firm* — Andrew C. Cheng

(57) ABSTRACT

The disclosure provides a liquid crystal display device and a liquid crystal display panel thereof. The liquid crystal display panel comprises a sealant and multiple first supportive members embedded in the sealant. The material of the plurality of first supportive members is the same as a second supportive member in a display region of the liquid crystal display panel. The first supportive member has a contact hole, such that the array substrate conducts with the color film substrate through the contact hole. The disclosure can avoid gap mura of the frame section, where the sealant is located. Meanwhile, a narrow frame of the liquid crystal display panel can be ensured, and the cost is lowered.

16 Claims, 2 Drawing Sheets

(51) Int. Cl.
*G02F 1/1335* (2006.01)
*G02F 1/1362* (2006.01)

(52) U.S. Cl.
CPC .. *G02F 1/133512* (2013.01); *G02F 1/133514* (2013.01); *G02F 1/136209* (2013.01); *G02F 2001/13398* (2013.01); *G02F 2201/121* (2013.01); *G02F 2201/123* (2013.01)

(58) Field of Classification Search
CPC ........ G02F 2001/136222; G02F 2001/133388; G02F 2201/121; G02F 1/339; G02F 1/13393; G02F 2001/133981
USPC ......... 349/106, 110, 153, 155–157, 111, 149
See application file for complete search history.

(56) References Cited

U.S. PATENT DOCUMENTS

| | | | |
|---|---|---|---|
| 8,421,982 B2* | 4/2013 | Kim | G02F 1/1339 349/153 |
| 8,830,438 B2* | 9/2014 | Chen | G02F 1/1335 349/153 |

FOREIGN PATENT DOCUMENTS

| | | |
|---|---|---|
| CN | 103135287 B | 8/2016 |
| JP | 2007047343A A | 8/2005 |

\* cited by examiner

LIQUID CRYSTAL DISPLAY DEVICE AND LIQUID CRYSTAL DISPLAY PANEL THEREOF

TECHNICAL FIELD

The disclosure is related to the field of displays, specifically to a liquid crystal display device and a liquid crystal display panel thereof, and more particularly to a non-display region of a package structure of a liquid display panel.

RELATED ART

In general, a sealant is disposed in liquid crystal display panels. The sealant is disposed at the edge for packaging the liquid crystal display panel and preventing the leakage of liquid crystal molecules. In addition, in order to improve the performance of the display, a narrow frame is used so as to meet the tendency of narrow frames. Further, cell gaps are disposed in the sealant for supporting a top substrate and a bottom substrate; spacers and Au balls are used for conducting the top frame and the bottom frame. The spacers are mainly prepared by melamine resin, PS and so forth. The compression rate of those materials are usually higher than the compression rate of the photo spacers in active area (AA), such that the compression of the sealant is more seriously. Thus, the cell gap of the region, where the sealant is located, is smaller than the cell gap of the display region, which causes the problem of gap mura at the region where the sealant is located.

SUMMARY

According to the above problem, the disclosure provides a liquid crystal display device and a liquid crystal display panel, such that a narrow frame can be ensured while gap mura of the frame section can be avoided.

According to a technical solution of the disclosure, a liquid crystal display panel is provided. The liquid crystal display panel comprises an array substrate, a color film substrate, a liquid crystal filled between the array substrate and the color film substrate, and a package frame surrounding the liquid crystal and connecting with the array substrate and the color film substrate by cell alignment, wherein the package frame is disposed at a non-display region of the liquid crystal display panel. The package frame comprises a sealant, a plurality of first supportive members embedded in the sealant, and a first color resist layer formed on the array substrate. The material of the plurality of first supportive members is the same as the material of a second supportive member in a display region of the liquid crystal display panel. The first supportive member is disposed on the first color resist layer, and the first supportive member and the second supportive member in the display region are formed synchronously. The first supportive member has a contact hole, the contact hole passes through the first color resist layer, such that the array substrate conducts with the color film substrate through the contact hole. A sidewall of the contact hole is covered by a conductive medium layer, and the conductive medium layer is configured for electrically connecting with a common electrode on the color film substrate and a common line on the array substrate.

In one embodiment, the first color resist layer and a second color resist layer in the display region of the liquid crystal display panel are formed synchronously.

In one embodiment, the package frame further comprises a first sidewall and a second sidewall, the first sidewall and the second sidewall surrounds the liquid crystal, and the sealant and the plurality of first supportive members are sandwiched between the first sidewall and the second sidewall.

In one embodiment, the first sidewall, the second sidewall and any structures on the array substrate are formed synchronously, and the structures comprise a gate insulating layer, a passivation layer, a black matrix layer and a pixel electrode layer.

In one embodiment, the first sidewall, the second sidewall and any structures on the color film substrate are formed synchronously, and the structures comprise the common electrode and a black matrix layer on the color film substrate.

In one embodiment, the sealant comprises a plurality of sealant sections disposed with intervals, the package frame further comprises a plurality of color resist blocks, and the plurality of color resist blocks is juxtaposed with the plurality of sealant sections.

According to another technical solution of the disclosure, a liquid crystal display panel is provided. The liquid crystal display panel comprises an array substrate, a color film substrate, a liquid crystal filled between the array substrate and the color film substrate, and a package frame surrounding the liquid crystal and connecting with the array substrate and the color film substrate by cell alignment, wherein the package frame is disposed at a non-display region of the liquid crystal display panel. The package frame comprises a sealant and a plurality of first supportive members embedded in the sealant. The material of the plurality of first supportive members is the same as the material of a second supportive member in a display region of the liquid crystal display panel. The first supportive member has a contact hole, such that the array substrate conducts with the color film substrate through the contact hole.

In one embodiment, the package frame further comprises a first color resist layer formed on the array substrate, the first supportive member is disposed on the first color resist layer, and the contact hole passes through the first color resist layer.

In one embodiment, the first color resist layer and a second color resist layer in the display region of the liquid crystal display panel are formed synchronously.

In one embodiment, the first supportive member and the second supportive member in the display region are formed synchronously.

In one embodiment, a sidewall of the contact hole is covered by a conductive medium layer, and the conductive medium layer is configured for electrically connecting with a common electrode on the color film substrate and a common line on the array substrate.

In one embodiment, the package frame further comprises a first sidewall and a second sidewall, the first sidewall and the second sidewall surrounds the liquid crystal, and the sealant and the plurality of first supportive members are sandwiched between the first sidewall and the second sidewall.

In one embodiment, the first sidewall, the second sidewall and any structures on the array substrate are formed synchronously, and the structures comprise a gate insulating layer, a passivation layer, a black matrix layer and a pixel electrode layer.

In one embodiment, the first sidewall, the second sidewall and any structures on the color film substrate are formed synchronously, and the structures comprise the common electrode and a black matrix layer on the color film substrate.

In one embodiment, the sealant comprises a plurality of sealant sections disposed with intervals, the package frame further comprises a plurality of color resist blocks, and the plurality of color resist blocks is juxtaposed with the plurality of sealant sections.

According to another technical solution of the disclosure, a liquid crystal display device is provided. A liquid crystal display panel of the liquid crystal display device comprises an array substrate, a color film substrate, a liquid crystal filled between the array substrate and the color film substrate, and a package frame surrounding the liquid crystal and connecting with the array substrate and the color film substrate by cell alignment, wherein the package frame is disposed at a non-display region of the liquid crystal display panel. The package frame comprises a sealant and a plurality of first supportive members embedded in the sealant. The material of the plurality of first supportive members is the same as the material of a second supportive member in a display region of the liquid crystal display panel. The first supportive member has a contact hole, such that the array substrate conducts with the color film substrate through the contact hole.

In one embodiment, the package frame further comprises a first color resist layer formed on the array substrate, the first supportive member is disposed on the first color resist layer, and the contact hole passes through the first color resist layer.

In one embodiment, the first color resist layer and a second color resist layer in the display region of the liquid crystal display panel are formed synchronously.

In one embodiment, the first supportive member and the second supportive member in the display region are formed synchronously.

In one embodiment, a sidewall of the contact hole is covered by a conductive medium layer, and the conductive medium layer is configured for electrically connecting with a common electrode on the color film substrate and a common line on the array substrate.

According to the liquid crystal display device and the liquid crystal display panel of the disclosure, the material of the first supportive member, which is embedded in the sealant, is the same as the material of the second supportive member, which is disposed a the display region. In other words, PS are used as the supportive members in the display region and the non-display region, such that they can maintain the same compression rate, the cell gap of the display region and the non-display region can be maintained identically. Thus, gap mura of the region, where the sealant is located, can be avoided. In addition, the array substrate can conduct with the color film substrate through the contact hole of the first supportive member, and spacers and Au balls, which are presently used, can be avoided, and the cost can be lowered.

In order to more clearly illustrate the features and technical solutions of the disclosure, the accompanying descriptions and drawings are described as blow. It is apparently that the drawings below are merely some embodiments of the disclosure, which do not limit the scope of the disclosure.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
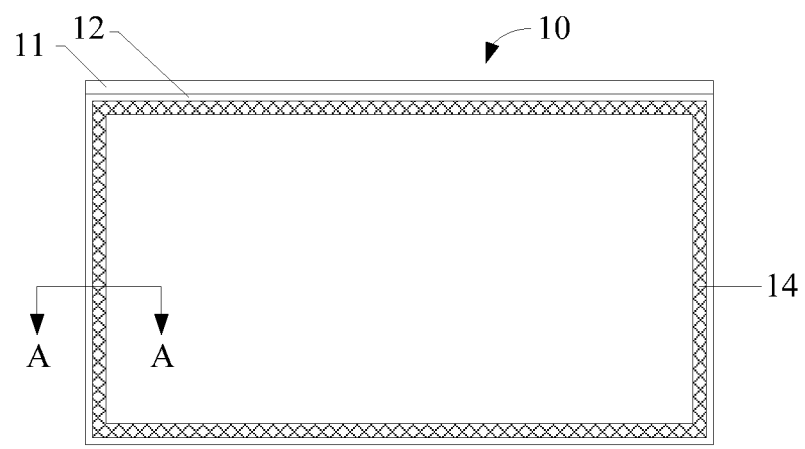
FIG. 1 is a top view of the liquid crystal display panel according to an embodiment the disclosure.
Figure 2:
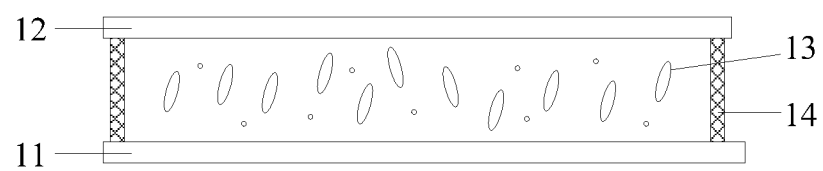
FIG. 2 is a sectional view of the liquid crystal display panel in FIG. 1.

FIG. 1 is a top view of the liquid crystal display panel according to an embodiment the disclosure; FIG. 2 is a sectional view of the liquid crystal display panel in FIG. 1. As shown in FIGS. 1 and 2, the liquid crystal display panel 10 comprises an array substrate 11 (thin film transistor, TFT), a color film substrate 12 (color filter, CF substrate or color filter substrate) opposite to the array substrate 11, a liquid crystal 13 filled between the array substrate 11 and the color film substrate 12, and a package frame 14 surrounding the liquid crystal 13. The package frame 14 is sandwiched between the array substrate 11 and the color film substrate 12 and the package frame 14 is disposed as a rectangle. The package frame 14 is configured for packaging the liquid crystal cell constituted by the array substrate 11 and the color film substrate 12. In other words, the package frame 14 connects with the array substrate 11 and the color film substrate 12 by cell alignment through its stickiness.

The liquid crystal display panel 10 comprises a display region and a non-display region. The non-display region is disposed outside the display region as well as the non-display region surrounds the display region. The package frame 14 is disposed in the non-display region.

Figure 3:
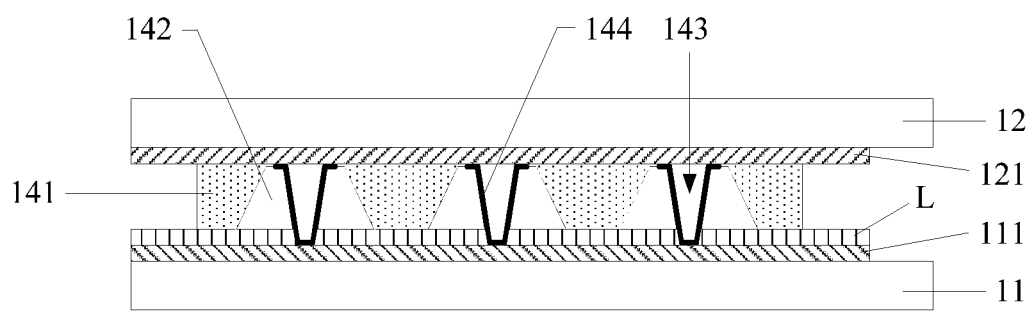
FIG. 3 is a sectional view of the liquid crystal display panel along A-A in FIG. 1 according to an embodiment the disclosure.

FIG. 3 is a sectional view of the liquid crystal display panel along A-A in FIG. 1 according to an embodiment the disclosure. As shown in FIG. 3, the package frame 14 comprises a sealant 141 and a plurality of first supportive members 142 (the amount of the first supportive members 142 is not limited to 3 as shown in the figure), the plurality of first supportive members 142 is embedded in the sealant 141. Each of the first supportive member 142 has a contact hole 143, such that the array substrate 11 conducts with the color film substrate 12 through the contact hole 143.

For example, the contact hole 143 passes through a flat layer L, which is disposed on the array substrate 11 and is closed to the liquid crystal 13, along the direction perpendicular to the array substrate 11. A sidewall of the contact hole 143 may be covered by a conductive medium layer 144. A common electrode 121 on the color film substrate 12 and a common line 111 on the array substrate 11 can be electrically connected with each other by the conductive medium layer 144.

The material of the plurality of first supportive members 142 is the same as the material of a second supportive member in the display region of the liquid crystal display panel 10. The second supportive member is the PS, which is configured for controlling the thickness and uniformity of the gap between the array substrate 11 and the color film substrate 12. In other words, PS is used as the supportive member in the display region and the non-display region of the liquid crystal display panel 10, and they have the same compression rate, such that the cell gap of the display region and the non-display region can be maintained identically. Thus, gap mura of the region, where the sealant 141 is located, can be avoided as well as a narrow frame of the liquid crystal display panel 10 can be ensured.

In addition, the array substrate 11 can be conductive with the color film substrate 12 by the contact hole 143 of the first supportive member 142, such that spacers and Au balls, which are presently used, can be avoided. As compared with present technology, the cost of the materials of spacers and Au balls is saved, the process of disposing spacers and Au balls can be avoided, and the total cost is greatly lowered.

In this embodiment, since the material of the first supportive member 142 is the same as the material of the second supportive member, for simplifying the process of the liquid crystal display panel 10, the first supportive member 142 and the second supportive member are formed synchronously. In other words, the first supportive member 142 and the second supportive member are formed by the same process of PS photomask etching.

Figure 4:
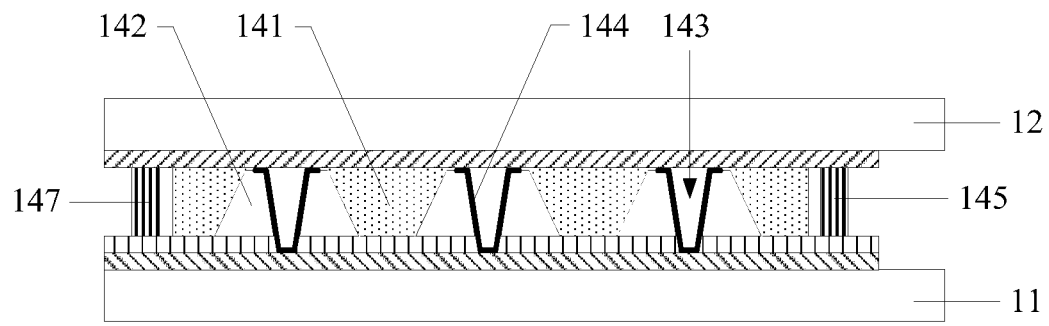
FIG. 4 is a sectional view of the liquid crystal display panel along A-A in FIG. 1 according to another embodiment the disclosure.

FIG. 4 is a sectional view of the liquid crystal display panel along A-A in FIG. 1 according to another embodiment the disclosure. As shown in FIG. 4, the package frame 14 further comprises a first sidewall 147 and a second sidewall 145. The first sidewall 147 and the second sidewall 145 surrounds the liquid crystal 13. The sealant 141 and the plurality of first supportive members 142 are sandwiched between the first sidewall 147 and the second sidewall 145. Thus, the leakage of the sealant 141 can be avoided, and they can be used as the supportive member between the array substrate 111 and the color film substrate 12.

Based on the above principle, in some other embodiments of the disclosure, the package frame 14 comprises a sealant 141 and a plurality of color resist blocks. Meanwhile, the sealant 141 comprises a plurality of sealant sections disposed with intervals. The plurality of color resist blocks is juxtaposed with the plurality of sealant sections. Thus, the package frame 14 can also achieve the effect of packaging and supporting.

The above described first sidewall 147 and the second sidewall 145 are formed synchronously with any structures on the array substrate 11. The structures comprise a gate insulating layer, a passivation layer, a black matrix layer and a pixel electrode layer (the above described common line 111). Alternatively, the first sidewall 147 and the second sidewall 145 are formed synchronously with any structures on the color film substrate 12. The structures comprise the common electrode 121 and a black matrix layer (in this embodiment, the array substrate 11 may not include a black matrix layer) on the color film substrate 12. In some other embodiment, the package frame 14 can comprises only one selected form the group constituted by the first sidewall 147 and the second sidewall 145.

Figure 5:
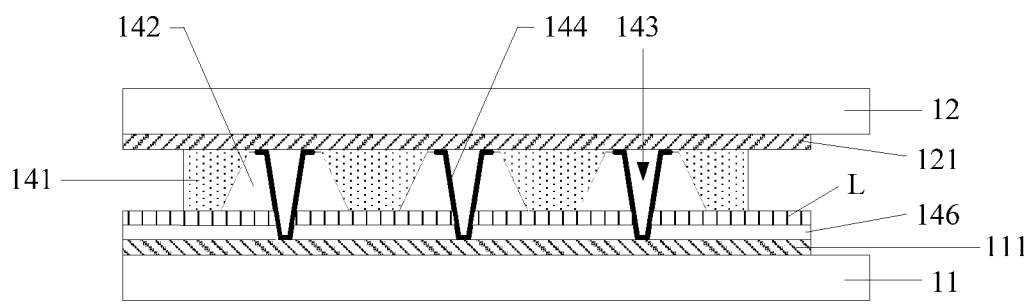
FIG. 5 is a sectional view of the liquid crystal display panel along A-A in FIG. 1 according to another embodiment the disclosure.

FIG. 5 is a sectional view of the liquid crystal display panel along A-A in FIG. 1 according to another embodiment the disclosure. As shown in FIG. 5, the difference between FIG. 3 and FIG. 5 is that: in this embodiment, the package frame 14 further comprises a first color resist layer 146 formed on the array substrate 11. The first supportive member 142 is disposed on the first color resist layer 146, specifically, the first supportive member 142 is disposed on the flat layer L. The contact hole 143 passes through the flat layer L and the first color resist layer 146 along the direction perpendicular to the array substrate 11.

Regarding the embodiments of FIGS. 3 and 4, they merely use the first supportive member 142 as the supportive member, such that they need additional processes for the liquid crystal display panels 10, which have a greater gap between the array substrate 11 and the color film substrate 12. For example, identical material should be used to perform coating and photomask etching for forming a supportive member on the first supportive member 142. However, in this embodiment, the first color resist layer 146 and the second color resist layer can be synchronously formed (with a certain thickness) in the process of forming color resist of the liquid crystal display panel 10. Wherein, the second color resist layer is the color resist of the pixel electrode in the display region of the liquid crystal display panel 10. Then, the first supportive member 142 can be formed on the first color resist layer 146. Thus, the embodiment can be used for the liquid crystal display panel 10 having a higher need of supporting ability.

According to the embodiments of the disclosure, the plurality of first supportive members 142 can be a cylinder, a trapezoid, a cone or the combination thereof. In other words, the plurality of first supportive members 142 is not limited to its structure.

The disclosure further provides a liquid crystal display device, comprising any one of the above described liquid crystal display panel 10. Thus, it can have the same advantages.

According to the liquid crystal display device and the liquid crystal display panel of the disclosure, the material of the supportive member, which is embedded in the sealant, is the same as the material of the supportive member, which is located in the display region. In other words, PS are used as the supportive members in the display region and the non-display region, such that they can maintain the same compression rate, the cell gap of the display region and the non-display region can be maintained identically. Thus, gap mura of the region, where the sealant is located, can be avoided. In addition, the two substrates can conduct with each other through the contact hole of the PS, and spacers and Au balls, which are presently used, can be avoided, and the cost can be lowered.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A liquid crystal display panel, comprising: an array substrate; an opposite substrate; a liquid crystal filled between the array substrate and the opposite substrate; and a package frame surrounding the liquid crystal and connecting with the array substrate and the opposite substrate, wherein the package frame is disposed at a non-display region of the liquid crystal display panel; wherein the package frame comprises: a sealant; a plurality of first supportive members embedded in the sealant; and a first color resist layer formed on the array substrate; wherein the material of the plurality of first supportive members is the same as the material of a second supportive member in a display region of the liquid crystal display panel; wherein the first supportive member is disposed on the first color resist layer, and the first supportive member and the second supportive member in the display region are formed synchronously; wherein the first supportive member has a contact hole, the contact hole passes through the first color resist layer and is surrounded by the first supportive member, such that a direction of a major axis of the contact hole extends from the array substrate to the opposite substrate and the array substrate conducts with the opposite substrate through the contact hole; wherein a sidewall of the contact hole is covered by a conductive medium layer, and the conductive medium layer is configured for electrically connecting with a common electrode on the opposite substrate and a common line on the array substrate.

2. The liquid crystal display panel according to claim 1, wherein the first color resist layer and a second color resist layer in the display region of the liquid crystal display panel are formed synchronously.

3. The liquid crystal display panel according to claim 1, wherein the package frame further comprises a first sidewall and a second sidewall, the first sidewall and the second sidewall surround the liquid crystal, and the sealant and the plurality of first supportive members are sandwiched between the first sidewall and the second sidewall.

4. The liquid crystal display panel according to claim 1, wherein the sealant comprises a plurality of sealant sections disposed with intervals, the package frame further comprises a plurality of color resist blocks, and the plurality of color resist blocks is juxtaposed with the plurality of sealant sections.

5. A liquid crystal display panel, comprising: an array substrate; an opposite substrate; a liquid crystal filled between the array substrate and the opposite substrate; and a package frame surrounding the liquid crystal and connecting with the array substrate and the opposite substrate, wherein the package frame is disposed at a non-display region of the liquid crystal display panel; wherein the package frame comprises: a sealant; and a plurality of first supportive members embedded in the sealant; wherein the material of the plurality of first supportive members is the same as the material of a second supportive member in a display region of the liquid crystal display panel; wherein the first supportive member has a contact hole that passes through the first color resist layer and is surrounded by the first supportive member, such that a direction of a major axis of the contact hole extends from the array substrate to the opposite substrate and the array substrate conducts with the opposite substrate through the contact hole; wherein the package frame further comprises a first color resist layer formed on the array substrate, and the contact hole passes through the first color resist layer.

6. The liquid crystal display panel according to claim 5, wherein the first supportive member is disposed on the first color resist layer.

7. The liquid crystal display panel according to claim 6, wherein the first color resist layer and a second color resist layer in the display region of the liquid crystal display panel are formed synchronously.

8. The liquid crystal display panel according to claim 5, wherein the first supportive member and the second supportive member in the display region are formed synchronously.

9. The liquid crystal display panel according to claim 5, wherein a sidewall of the contact hole is covered by a conductive medium layer, and the conductive medium layer is configured for electrically connecting with a common electrode on the opposite substrate and a common line on the array substrate.

10. The liquid crystal display panel according to claim 5, wherein the package frame further comprises a first sidewall and a second sidewall, the first sidewall and the second sidewall surround the liquid crystal, and the sealant and the plurality of first supportive members are sandwiched between the first sidewall and the second sidewall.

11. The liquid crystal display panel according to claim 5, wherein the sealant comprises a plurality of sealant sections disposed with intervals, the package frame further comprises a plurality of color resist blocks, and the plurality of color resist blocks is juxtaposed with the plurality of sealant sections.

12. A liquid crystal display device, a liquid crystal display panel of the liquid crystal display device comprising: an array substrate; an opposite substrate; a liquid crystal filled between the array substrate and the opposite substrate; and a package frame surrounding the liquid crystal and connecting with the array substrate and the opposite substrate, wherein the package frame is disposed at a non-display region of the liquid crystal display panel; wherein the package frame comprises: a sealant; and a plurality of first supportive members embedded in the sealant; wherein the material of the plurality of first supportive members is the same as the material of a second supportive member in a display region of the liquid crystal display panel; wherein the first supportive member has a contact hole that passes through the first color resist layer and is surrounded by the first supportive member, such that a direction of a major axis of the contact hole extends from the array substrate to the opposite substrate and the array substrate conducts with the opposite substrate through the contact hole; wherein the package frame further comprises a first color resist layer formed on the array substrate, and the contact hole passes through the first color resist layer.

13. The liquid crystal display device according to claim 12, wherein the first supportive member is disposed on the first color resist layer.

14. The liquid crystal display device according to claim 13, wherein the first color resist layer and a second color resist layer in the display region of the liquid crystal display panel are formed synchronously.

15. The liquid crystal display device according to claim 12, wherein the first supportive member and the second supportive member in the display region are formed synchronously.

16. The liquid crystal display device according to claim 12, wherein a sidewall of the contact hole is covered by a conductive medium layer, and the conductive medium layer is configured for electrically connecting with a common electrode on the opposite substrate and a common line on the array substrate.

* * * * *